UNITED STATES PATENT OFFICE.

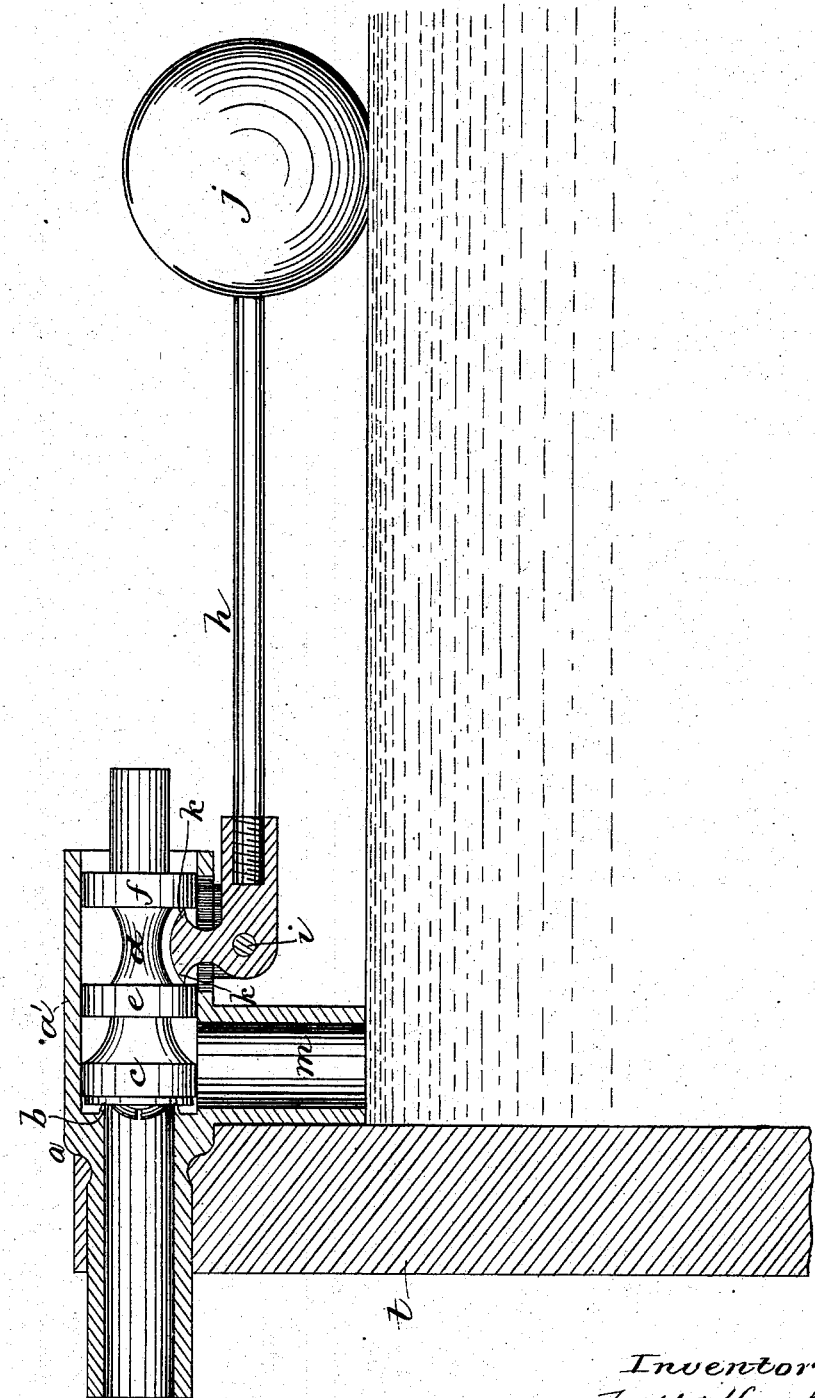

FRANK D. McDOWELL, OF SALEM, OREGON.

FINGER-RING GAGE.

SPECIFICATION forming part of Letters Patent No. 291,373, dated January 1, 1884.

Application filed June 20, 1882. (Model.)

*To all whom it may concern:*

Be it known that I, FRANK D. McDOWELL, of Salem, in the county of Marion and State of Oregon, have invented a new and useful Improvement in Ring-Gages, of which the following is a full, clear, and exact description.

The object of my invention is to provide a gage especially for use by jewelers in the work of reducing rings; and it consists in the addition to a ring-gage of ordinary construction of lines or marks that show accurately the difference between the sizes of rings, so that in the reduction of a ring the length to be removed can be accurately determined, as more particularly explained hereinafter.

Reference is to be had to the accompanying drawings, forming a part of this specification, in which similar letters of reference indicate corresponding parts in both the figures.

Figure 1 is an elevation of a ring-gage with my improvements. Fig. 2 is a plan view illustrating the working of the gage.

The gage A is of the usual tapering form, and has its surface marked with rings, as usual, that indicate the sizes, and also is marked to indicate the subdivisions of the sizes upon the line $a$, that extends lengthwise of the gage.

$b\ b$ are lines for indicating the difference in sizes. The lines $b$ are drawn at such an angle with the line $a$ that the part of each transverse line included between the line $a$ and the line $b$ shall just equal the difference in length between the intersected transverse line and the line at which the said line $b$ originates—that is, equal to the difference in the circumference of the stick at the two points. In the ordinary gage used by jewelers this requires the line $b$ to be drawn at an angle of ten degrees with the longitudinal line $a$; but this angle obviously depends on the taper of the gage and cannot be arbitrarily fixed. Taking any one of the lines $b$ at its starting-point on the line $a$, its departure from the line $a$ increases uniformly, and the distance between the line $a$ and the line $b$ upon any one of the transverse size-lines is the indication of the difference in the circumference of the rings, and shows the amount that it is necesssary to remove in order to reduce the ring. Thus, supposing a ring of size No. 6 to be placed upon the gage and it is desired to reduce it to size No. 3, the length necessary to be removed from the ring is indicated upon size-line 6 by the crossing of the line $b$, which starts from the size-line 3, and by marking the ring at the line $a$ and intersection of line $b$ an accurate indication is obtained for reduction of the ring. These lines $b$ are to be placed in connection with all the size-lines and their subdivisions. By their use this work, which has frequently to be done by jewelers, and is generally done by guess, can be accurately carried out.

Having thus described my invention, I claim as new and desire to secure by Letters Patent—

1. A ring-gage of tapering form provided with lines indicating the sizes, and with intersecting lines that indicate the differences in the circumferences of the different sizes, as shown and described.

2. In ring-gages, the inclined or spiral lines $b$, combined with the transverse size-lines and the longitudinal marking-line $a$, as and for the purposes set forth.

FRANK D. McDOWELL.

Witnesses:
 GEO. H. BURNETT,
 WM. F. SKIFF.